Jan. 7, 1969  W. A. RAY  3,420,492

BISTABLE VALVE MECHANISM OR THE LIKE

Filed Oct. 6, 1965

INVENTOR.
WILLIAM A. RAY

United States Patent Office 3,420,492
Patented Jan. 7, 1969

3,420,492
BISTABLE VALVE MECHANISM OR THE LIKE
William A. Ray, North Hollywood, Calif., assignor to International Telephone and Telegraph Corporation, New York, N.Y., a corporation of Maryland
Filed Oct. 6, 1965, Ser. No. 493,510
U.S. Cl. 251—68
Int. Cl. F16k 31/08
6 Claims

ABSTRACT OF THE DISCLOSURE

A valve device for fluids in which the valve or control member is normally resiliently retained in a valve-closed position and moved to a valve-open position by electromagnetic means aided by permanent magnets. When the control member reaches valve-open position, it is retained in the position by the permanent magnets. Return to a valve-closed position is effected by the electromagnetic means working in opposition to the permanent magnets and in concert with a spring.

---

This invention relates to mechanisms for controlling the position of a movable element, and more particularly to a unique actuating mechanism utilizing magnetic means to effect stable positioning of a movable element or control member in one or the other of two possible positions.

The invention will be described in the context of a valve structure, but will be seen to have utility wherever it is desired to achieve bistable positioning of a movable element. Bistable valves heretofore known are characterized in the use of a permanent magnet element as the movable valve member. Typically, such valve members are positioned between the pole pieces of electromagnets, the polarities of which are varied in accordance with the direction of current established in a control coil or coils. With such pole pieces established as north poles, for example, the north pole of the permanent magnet is repelled from the adjacent pole piece, and the south pole of the permanent magnet is attracted to the pole piece adjacent thereto, e.g., to close off fluid communication between two ports. The reverse movement of the valve member takes place when the polarities of the pole pieces are changed to south poles, thereby to establish fluid communication between the ports.

While valve mechanisms of this type are bistable devices, in that the valve member when placed in either of its two positions will remain in that position until forced to its other position, they have the disadvantage that their operation inherently impairs the strength of the permanent magnet. In this connection, it will be appreciated that movement of the valve member causes its ends to strike the adjacent pole pieces with some force. As with any permanent magnet, such repeated blows disturb the orientation of the magnetic domains within the body of the magnet. In time, there is a sufficient disruption of the magnetic domains as to render the valve member unresponsive to the influence of the control currents in the electromagnets.

It is an object of my invention to provide a mechanism for effecting bistable operation of a movable element, which utilizes electromagnetic and permanent magnet effects to move the element from one position to the other, but wherein the permanent magnet is stationary and is not engaged by any moving part.

Another object of my invention is to provide a unique bistable valve mechanism in which a valve member can be electromagnetically or manually moved to and retained in either of two stable positions.

A still further object of my invention is to provide an improved bistable valve mechanism of packless design which can be operated manually or through the application of either a continuous or momentary electromagnetic circuit operation.

The above and other objects and advantages of my invention will become apparent from the following description taken in conjunction with the accompanying drawing of an illustrative embodiment thereof, in which.

Figure 1:
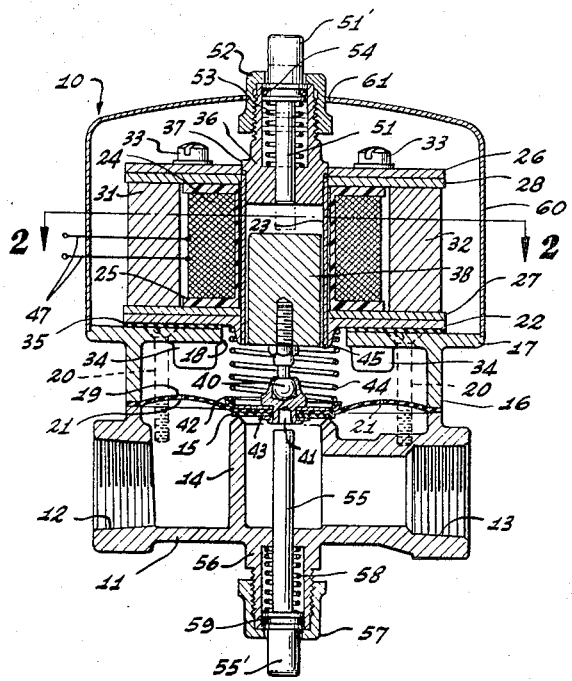
FIGURE 1 is a longitudinal sectional view of a bistable valve of my invention, showing the valve member in one of its stable positions.
Figure 2:
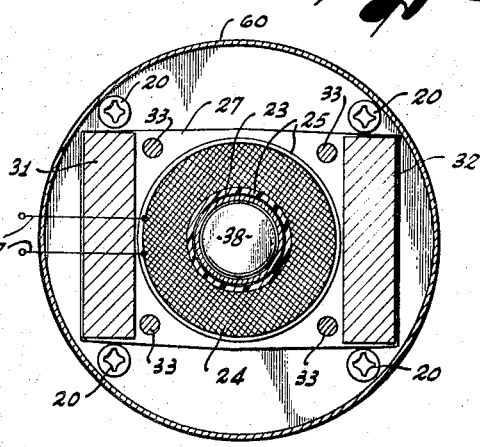
FIGURE 2 is a sectional view taken along the line 2—2 of FIGURE 1.

Referring to FIGURES 1 and 2, a bistable valve 10 is shown wherein a valve body or housing 11 is provided with an inlet port 12 and an outlet port 13, fluid communication between which is to be selectively controlled. The valve body 11 is formed so that the outlet port 13 extends to the interior of a short, cylindrical section 14, the upper end of which forms a valve seat for a resilient valve element 15. Thus, when the element 15 is placed against the valve seat, it closes off communication between the ports 12, 13. Raising the element 14 permits fluid from the inlet port 12 to flow into the interior of the cylindrical section 14 and out of the outlet port 13.

Secured to the valve body 11 is a bonnet 16 of nonmagnetic material which is formed at its upper end with a flat wall portion 17 having a central opening 18. The confronting ends of the valve body 11 and the bonnet 16 clamp the peripheral portion of a flexible diaphragm 19, the center portion of which is carried with the valve element 15. Any suitable means may be used to secure the bonnet to the valve body, e.g., flat head screws 20 which extend through countersunk openings in the wall 17 and threaded into the valve body. The diaphragm need not be used; but if it is, it is made with openings 21 to allow fluid to enter the bonnet, but small enough to prevent unwanted particles passing therethrough.

Mounted on the exterior of the wall 17 is a base plate 22 of magnetic material which has a central opening in which the lower end of a nonmagnetic tube 23 is secured. Surrounding the tube 23 is a control coil 24, shown supported on a nonmetallic, e.g., plastic, coil form 25. The upper end of the tube 23 extends above the coil form 25, and is secured in the central opening of a plate 26 which, like the base plate 22, is formed of magnetic material. If desired, additional magnetic plates 27, 28 may be provided between the ends of the coil form 25 and the plates 22, 26.

Permanent magnets 31, 32 are positioned between the pairs of plates 22, 27 and 26, 28. The magnets and coil form are clamped between the plates, and the base plate 22 is secured to the wall 17. If desired, the same fastening means may be employed for these purposes, e.g., nonmegnetic screws 33 which pass through the plates 26, 28, 27, 22 and thread into bosses 34 which are integral with, and extend below, the wall 17. For sealing purposes, a gasket 35 is provided between the base plate 22 and the wall 17, so that tightening the screws 33 prevents fluid leakage between the base plate 22 and the wall 17.

Inserted part way in the upper end of the tube 23 is a plug 36 which has a flange 37 resting on the top of the tube. If desired, the tube may be tack welded at its ends to the plug and to the base plate 22. The plug 36, like the various plates, is made of magnetic material.

Slidably and loosely mounted in the tube 23 is a plunger 38. Threaded into the lower end of the plunger 38 is a stem which terminates at its lower end in a ball 40. The ball 40 is part of a ball-and-socket connection, the socket 41 of which carries a flanged metal disc 42, to which the resilient valve element 15 and the center of the diaphragm 19 are secured. In this connection, the socket 41 has a reduced diameter end portion which extends through the disc 42, the diaphragm 19 and the valve element 15. A metal washer 43 is placed over the lower end of the socket, and the diaphragm 19 and valve element 14 are clamped between the disc 42 and the washer 43, as by spinning the lower end of the socket over against the washer.

Thus, it will be seen that the plunger 38 has a lower position in which the element 15 rests against its seat, and cuts off fluid communication between the ports 12, 13. Since the plunger is loosely fitted in the tube 23, the ball-and-socket connection 40, 41 provides whatever adjustment is necessary to make the valve element 15 seat properly. To further aid in this regard, there is provided a spring biasing member 44 which extends between the flanged disc 42 and the lower surface of the base plate 22. To aid in locating the upper end of the spring, the base plate 22 is provided with a central, downwardly extending projection 45, around which the upper end turns of the spring 34 are located. The lower end of the spring is located within the flange of the disc 42. The spring 44 exerts a sufficient downward thrust on the flanged disc 42 to keep the valve element 15 in firm engagement with the valve seat.

Figure 3:
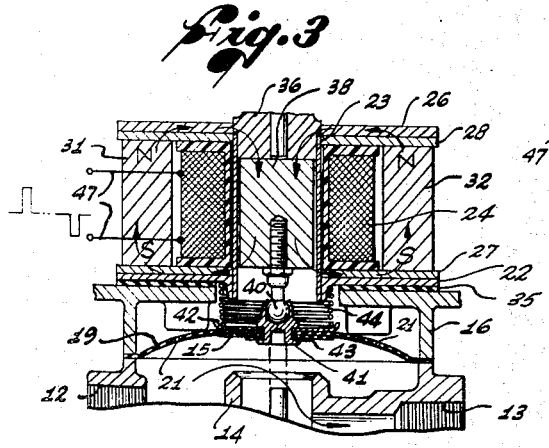
FIGURE 3 is a fragmentary longitudinal sectional view of the valve structure with the valve member moved to the other of its two stable positions.

However, the force exerted by the spring 44 is readily overcome by the application of a current to the control coil 24 in such a direction as to pull the plunger 38 upwardly. Referring to FIGURE 3 along with FIGURES 1 and 2, leads 47 are provided for establishing current flow in either direction through the coil 24. In this regard, my invention facilitates the upward movement of the plunger 38 and the retention of the plunger in its upper position, upon application of a momentary pulse of current applied to the leads 47. The permanent magnets 31, 32 are oriented in the same direction, and in FIGURES 1 and 3 are shown with the north poles uppermost. Upon application of a pulse of current to the leads 47 to establish an aiding magnetic field through the coil, the plunger 38 is immediately retracted into the coil through the tube 23, whereupon it engages the lower end of the plug 36.

Upon termination of the pulse, the plunger 38 remains in contact with the lower end of the plug 36. As illustrated in FIGURE 3, this result occurs because there is established, via the permanent mangets 31, 32, closed magnetic circuits through the permanent magnets, the plates 26, 28, the plug 36, the plunger 38, and the plates 22, 27. Thus, by simply pulsing the coil 24 in the proper direction, the plunger 38 is retracted, and remains in this position, allowing fluid communication between the ports 12, 13.

With the plunger 38 in the upper position shown in FIGURE 3, pulsing the coil 24 in the reverse direction sets up an opposing electromagnetic field through the plunger 38. The repelling magnetic fields thus permit the plunger to be released from the plug 36, whereupon the spring 44 immediately urges the flanged disc 42 downwardly to cause the valve element 15 to seat.

My actuating mechanism includes means for electrically and/or manually setting the plunger 38 in either of its positions. Referring to FIGURES 1 and 3, the plug 36 has a plunger 51 extending through the center thereof, such plunger normally being biased upwardly so that its lower end is retracted within the plug 36. The plunger 51 is adapted to engage and force the plunger 38 downwardly away from contact with the plug 36, thereby to permit the plunger 38 to return to its lower position under the influence of the spring 44. As shown, the plug 36 is externally threaded at its upper end, and a nut 52 is threaded thereon. A compression spring 53 within the plug 36 constantly urges the head 51' of the plunger 51 upwardly to its retracted position. The head of the plunger 51 is suitably sealed, as by an O-ring seal 54 surrounding the head of the plunger within the plug 36.

A similar plunger 55 is provided in the lower portion of the valve body 11. The plunger 55 extends through a threaded projection 56 extending below the valve body and on which a nut 57 is threaded. As in the case of the plunger 51, the head 55' of the plunger 55 is urged outwardly by a compression spring 58, and an O-ring seal 59 is similarly provided. However, the inner end of the plunger 55 extends through the cylindrical portion or section 14 to a point immediately adjacent the lower end of the socket 41 of the ball-and-socket connection 40, 41. As indicated in FIGURE 3, the plunger 44 is adapted to be moved inwardly a sufficient distance to engage the socket 41 and force the plunger 38 upwardly until it contacts the lower end of the plug 36. Immediately upon such contact being made, the plunger 38 is retained in its upper position for the same reasons as described following upward movement of the plunger in response to an electric current pulse.

As a further aid to shield the magnets and associated parts from damage and exposure to the elements, I provide a cover 60 which is releasably secured to the bonnet 16, as by fitting it on the periphery of the wall 17. The cover 60 has a central opening 61 at its upper end through which the head 51' of the plunger 51 extends. Thus, both the manually operable plungers 51, 55 are adapted for operation exteriorly of the valve.

My invention is also adapted for operation with continuous current flow to hold the movable element in one position, and permits manual operation for checking purposes. For example, assume the current flow through the coil 24 is in the direction necessary to place the plunger in its upper position as in FIGURE 3. Depressing the upper plunger 51 forces the plunger 38 downwardly. With a plunger 51 of sufficient length, it can be used to cause the element 15 to move against its seat, thereby closing off communication between the ports 12, 13. Immediately upon releasing the plunger 51, the continuous current through the coil 24 immediately causes the plunger 38 to be retracted into engagement with the plug 36, in which position it remains until released, either by application of a reverse current to the coil, or shutting off the current and depressing the plunger 51.

Similarly, if continuous current through the coil is such as to establish an electromagnetic field opposing the fields of the permanent magnets, thereby keeping the plunger 38 in its downward position, depressing the lower plunger 55 unseats the valve element 15. Releasing the plunger 55 permits the valve element to be reseated immediately.

As previously mentioned, my invention is adapted for use in providing a bistable device for a variety of purposes. As one example, the valve body 11, bonnet 16 and diaphragm 19 could be replaced with a housing containing electrical contacts to be selectively opened and closed. In such case, the valve element 15 is removed and the flanged disc 42 forms a movable contact for establishing an electrical connection between the fixed contacts when the plunger 38 occupies its lower position.

Additionally, it is apparent that my invention embraces the use of a variety and number of forms and arrangements of permanent magnets for the purpose described. For example, only one of the magnets illustrated may be sufficient. Another variant is a single magnet surrounding the coil, e.g., as a cylinder having its poles engaging the confronting magnet plates. In the arrangement illustrated, magnet plates may be positioned as shown for the magnets, and the magnets placed in the position of, say, the upper plates shown and described herein, i.e., with the like poles of the magnets abutting the plug. In still another form, C-shaped magnets may be employed, in place of the bar magnets and plates illustrated.

Accordingly, it will be apparent that various modifications can be made in the apparatus shown and described

I claim:
1. Bistable apparatus comprising:
   (a) a stationary member of magnetic material;
   (b) a nonmagnetic tube secured at one end to said stationary member and extending away therefrom;
   (c) an element of magnetic material movable through said tube toward and away from said stationary member;
   (d) means normally biasing said element of magnetic material to a position spaced from said stationary member;
   (e) means including permanent magnets for establishing a continuous magnetic field to keep said stationary member at one magnetic polarity;
   (f) a coil surrounding said nonmagnetic tube;
   (g) means mechanically coupling the poles of said permanent magnets to said stationary member and to the end of said nonmagnetic tube remote from said stationary member; and
   (h) means for selectively establishing, aiding, or opposing magnetic fields in the space between said element of magnetic material and said stationary member, the aiding and continuous magnetic fields together being strong enough to cause said element of magnetic material to be attracted from said position spaced away from said stationary member into contact with said stationary member, the continuous magnetic field being effective to keep said element in contact with said stationary member, the opposing magnetic field when energized being effective to overcome the force of said continuous magnetic field to release said element of magnetic material for return to said position away from said stationary member;
   (i) said coupling means including a pair of parallel plates spaced apart and having central openings therein, said stationary member being disposed in the opening of one plate, the end of the nonmagnetic tube remote from said stationary member being disposed in the opening of the other plate, and said permanent magnets being located at the ends of said plates and extending between said plates, each plate being engaged by like poles of said magnets.

2. The combination of claim 1, further including a second stationary member at a position in fixed spaced relation to the first stationary member;
   and spring biasing means extending between said element and the plate in which said other end of said tube is disposed.

3. The combination of claim 2, further including a valve housing surrounding said second stationary member, said housing having fluid inlet and outlet ports, said second stationary member forming an enclosure with one opening in fluid communication with said outlet port and another opening covered by said element when said element is biased against said second stationary member, whereby movement of said element toward the first stationary member establishes fluid communication between said other opening and said inlet port.

4. The combination of claim 3, including a ball-and-socket connection having the ball supported by said element;
   a valve member carried by the socket of said ball-and-socket connection, said ball-and-socket connection being operative, in the normally biased position of said element, to cause said valve member to seat against said second stationary member and close off said other opening therein;
   a rigid disc carried by said element;
   and said spring biasing means being a compression spring extending between said disc and the plate in which said other end of said tube is disposed.

5. The combination of claim 2, further including a plunger slidable through the first stationary member;
   and means normally retracting said plunger within said first member, said plunger being operable, when said element is in contact with said first member, to forcibly separate said element from said first member.

6. The combination of claim 5, further including a second plunger slidable through said second stationary member;
   and means normally retracting said second plunger within said second member, said second plunger being operable to force said element into engagement with said first stationary member.

References Cited
UNITED STATES PATENTS

| | | | |
|---|---|---|---|
| 2,562,536 | 7/1951 | Mayer | 251—129 X |
| 2,596,409 | 5/1952 | Johnson et al. | 251—129 X |
| 2,637,343 | 5/1953 | Matthews | 251—65 |
| 2,828,937 | 4/1958 | Kreitchman | 251—129 |
| 2,972,465 | 2/1961 | Ray | 251—65 |
| 3,022,450 | 2/1962 | Chase | 335—229 X |
| 3,040,217 | 6/1962 | Conrad | 335—234 |
| 3,119,940 | 1/1964 | Pettit et al. | 335—229 X |
| 3,178,151 | 4/1965 | Caldwell | 335—229 X |
| 3,203,447 | 8/1965 | Bremmer | 251—129 X |
| 3,212,751 | 10/1965 | Hassa | 251—65 |
| 1,674,914 | 6/1928 | Murray | 251—130 |
| 2,695,154 | 11/1954 | Dillman | 251—130 X |
| 3,098,635 | 7/1963 | Delaporte | 251—335 X |
| 3,321,174 | 5/1967 | Schertler | 251—65 |

M. CARY NELSON, *Primary Examiner.*

ROBERT C. MILLER, *Assistant Examiner.*

U.S. Cl. X.R.

251—129